US011733366B2

(12) United States Patent
Choi et al.

(10) Patent No.: US 11,733,366 B2
(45) Date of Patent: Aug. 22, 2023

(54) METHOD OF IMPROVING DISTANCE MEASUREMENT ACCURACY AND ELECTRONIC DEVICE FOR SAME

(71) Applicant: Samsung Electronics Co., Ltd., Suwon-si (KR)

(72) Inventors: Junsu Choi, Suwon-si (KR); Chiho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 16/906,467

(22) Filed: Jun. 19, 2020

(65) Prior Publication Data

US 2020/0400806 A1 Dec. 24, 2020

(30) Foreign Application Priority Data

Jun. 20, 2019 (KR) .................. 10-2019-0073497

(51) Int. Cl.
*G01S 13/40* (2006.01)
(52) U.S. Cl.
CPC ................... *G01S 13/40* (2013.01)
(58) Field of Classification Search
CPC .................................................. G01S 13/40
See application file for complete search history.

(56) References Cited

U.S. PATENT DOCUMENTS

| 8,274,426 B2 | 9/2012 | Lee |
| 8,488,110 B2 | 7/2013 | Hug et al. |
| 2009/0224963 A1 | 9/2009 | Nakanishi |
| 2014/0030982 A1 | 1/2014 | Cardona |

(Continued)

FOREIGN PATENT DOCUMENTS

| EP | 3 015 881 A2 | 5/2016 |
| WO | 2017/222510 A1 | 12/2017 |

(Continued)

OTHER PUBLICATIONS

European Search Report dated Oct. 13, 2020, issued in European Application No. 20181219.5.

(Continued)

*Primary Examiner* — Peter M Bythrow
*Assistant Examiner* — Nazra Nur Waheed
(74) *Attorney, Agent, or Firm* — Jefferson IP Law, LLP

(57) ABSTRACT

A method for improving the accuracy of measuring a distance to an object using a wireless communication signal and an electronic device therefor the same are provided. The method includes transmitting a wireless communication signal to an external object by controlling a wireless communication module, receiving a signal returned based on the transmitted wireless communication signal being reflected from the external object by controlling the wireless communication module, acquiring a first distance to the external object based on a transmission time point of the transmitted signal and a reception time point of the received signal, acquiring a second distance to the external object based on phases of the transmitted signal and the received signal by controlling the phase matching module, and estimating a distance to the external object based on the first distance and the second distance.

15 Claims, 12 Drawing Sheets

(56) References Cited

U.S. PATENT DOCUMENTS

| | | |
|---|---|---|
| 2015/0256974 A1 | 9/2015 | Zobenko et al. |
| 2017/0212234 A1 | 7/2017 | Heath et al. |
| 2018/0017671 A1 | 1/2018 | Warke et al. |
| 2018/0059245 A1* | 3/2018 | Meinherz ................ G01S 17/86 |
| 2018/0180713 A1* | 6/2018 | Cohen .................... G01S 13/32 |
| 2018/0306911 A1 | 10/2018 | Pernstal et al. |
| 2018/0341000 A1 | 11/2018 | Cohen et al. |
| 2019/0182415 A1 | 6/2019 | Sivan |
| 2020/0034583 A1* | 1/2020 | Nikitin ............... G06K 7/10128 |

FOREIGN PATENT DOCUMENTS

| | | |
|---|---|---|
| WO | 2018/080608 A1 | 5/2018 |
| WO | 2018/094395 A1 | 5/2018 |
| WO | WO-2018080608 A1 * | 5/2018 |

OTHER PUBLICATIONS

International Search Report and written opinion dated Oct. 14, 2020, issued in International Application No. PCT/KR2020/008005.

\* cited by examiner

| STF (311) | CEF (313) | Header (315) | Data (317) | AGC (319) | TRN (321) |

| L-STF (351) | L-CEF (353) | L-Header (355) | EDMG-Header-A (363) | EDMG-STF (365) | EDMG-CEF (367) | EDMG-Header-B (369) | Data (357) | AGC (359) | TRN (361) |

METHOD OF IMPROVING DISTANCE MEASUREMENT ACCURACY AND ELECTRONIC DEVICE FOR SAME

CROSS-REFERENCE TO RELATED APPLICATION(S)

This application is based on and claims priority under 35 U.S.C. § 119(a) of a Korean patent application number 10-2019-0073497, filed on Jun. 20, 2019, in the Korean Intellectual Property Office, the disclosure of which is incorporated by reference herein in its entirety.

BACKGROUND

1. Field

The disclosure relates to a method of improving an accuracy of measuring a distance to an object using a wireless communication signal and an electronic device for the method.

2. Description of Related Art

With the generalization of the use of cell phones or smart phones, there is growing demand for the authentication of a user's face in order to enhance the security of a smart phone or for the recognition of an object or a person in the vicinity of a smart phone in order to execute various applications. In response to this demand, various methods of recognizing an object and measuring a distance to the object using a camera included in a smart phone have been proposed. There is also a method of using an infrared sensor, but this method has a limitation in accurately measuring a distance even though it is capable of sensing a neighboring object.

Meanwhile, a radar is a device capable of emitting an electromagnetic wave and performing, based on a reflected wave or a backscattered wave reflected from an object, operations such as identification or classification of existence/absence of the object, a distance to the object, an altitude of the object, a moving direction of the object, and a moving speed of the object. The radar generally uses a microwave frequency band (e.g., 300 MHz to 40 GHz). A radar for detecting objects in the vicinity of the front and rear corners of a vehicle or objects at a middle or long distance in front of the vehicle uses a frequency band of, for example, 24 GHz or 77 GHz.

A smart phone is equipped with an 802.11n or 802.11ac system for wireless data communication, and is capable of performing wireless communication using a band of 2.4 GHz or 5 GHz. In addition, as a wireless data communication system that enables a higher data transmission amount, 802.11ad and 802.11ay systems, which have been recently standardized or are being standardized by the Institute of Electrical and Electronic Engineers (IEEE), is capable of using a wide bandwidth of several GHz using a 60 GHz frequency band. The 802.11ad system is capable of using a single bandwidth of 2.16 GHz, and the 802.11ay system, which has extended the 802.11ad system, is capable of using a much wider bandwidth up to 8.64 GHz.

By using a wide bandwidth of several GHz band, the 802.11ay system is able to obtain a transmission speed of up to 100 Gbps. Using a wide bandwidth makes it possible to obtain a high transmission rate proportional to the bandwidth in wireless data communication. Furthermore, when an 802.11ay signal is used for radar functions such as identification or classification of existence/absence of the object, a distance to the object, an altitude of the object, a moving direction of the object, and a moving speed of the object, it is possible to obtain a high accuracy in proportion to the bandwidth.

The above information is presented as background information only to assist with an understanding of the disclosure. No determination has been made, and no assertion is made, as to whether any of the above might be applicable as prior art with regard to the disclosure.

SUMMARY

Considering the maximum bandwidth of 4.32 GHz, which is defined as a bandwidth that should be mandatorily supported in the standard, the minimum distance accuracy, capable of being measured using a distance measurement scheme of the related art or using an 802.11ay wireless signal using a broadband, may be determined to be about 4.28 cm. However, certain applications may require a fairly high accuracy to estimate positions in precise units of 1 cm and to determine what action to perform for each position. Accordingly, a system basically having resolution of 4.28 cm, such as an 802.11ay system, may be difficult to use in an application requesting an accuracy of 1 cm. In order to increase a distance estimation accuracy or a position estimation accuracy, an interpolation method is generally used. However, even if this method is added, there is a limit to improving the accuracy to 1 cm.

Aspects of the disclosure are to address at least the above-mentioned problems and/or disadvantages and to provide at least the advantages described below. Accordingly, an aspect of the disclosure is to provide a method of improving a distance estimation accuracy by additionally performing phase matching in addition to a procedure of the related art for performing distance estimation when an electronic device is used as a radar using a signal radiated from a device for wireless communication provided therein.

The technical problems to be addressed by the disclosure are not limited to those described above, and other technical problems, which are not described above, may be clearly understood by a person ordinarily skilled in the related art, to which the disclosure belongs.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication module configured to transmit a wireless communication signal to an external object and receive a signal reflected from the external object, a phase matching module configured to estimate a distance to the external object based on phases of the transmitted signal and the received signal, at least one processor operatively connected to the phase matching module and the wireless communication module, and at least one memory operatively connected to the at least one processor. The at least one memory may store instructions that, when executed, cause the at least one processor to control the wireless communication module to transmit the wireless communication signal to the external object, control the wireless communication module to receive a signal returned based on the transmitted wireless signal being reflected from the external object, acquire a first distance to the external object based on a transmission time point of the transmitted signal and a reception time point of the received signal, acquire a second distance to the external object based on phases of the received signal and the transmitted signal by controlling the phase matching module, and estimate a distance to the external object by comparing the first distance and the second distance.

In accordance with another aspect of the disclosure, a method of operating an electronic device is provided. The method includes an operation of transmitting a wireless communication signal to an external object, an operation of receiving a signal returned based on the transmitted wireless signal being reflected from the external object, an operation of acquiring a first distance to the external object based on a transmission time point of the transmitted signal and a reception time point of the received signal, an operation of acquiring a second distance to the external object based on phases of the transmitted signal and the received signal by controlling a phase matching module, and an operation of estimating a distance to the external object by comparing the first distance and the second distance.

In accordance with another aspect of the disclosure, an electronic device is provided. The electronic device includes a wireless communication module configured to transmit a wireless communication signal and receive a signal returned based on the transmitted wireless communication signal being reflected from an external object, a phase matching module configured to estimate a second distance to the external object based on phases of the transmitted communication signal and the received signal, at least one processor operatively connected to the phase matching module and the wireless communication module, and at least one memory operatively connected to the at least one processor. The at least one memory may store instructions that, when executed, cause the at least one processor to acquire a first distance to the external object based on a transmission time point of the transmitted signal and a reception time point of the received signal, and estimate a distance to the external object based on the first distance and the second distance.

When a method according to various embodiments and an electronic device for use in the method are used for a radar function using a signal radiated from a wireless communication circuit provided in the electronic device, it is possible to improve distance estimation accuracy by additionally performing phase matching in addition to a procedure of the related art for performing distance estimation of the related art.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A is a diagram illustrating a structure of a physical layer protocol data unit (PPDU) used in an 802.11ad system according to an embodiment of the disclosure;

FIG. 3B is a diagram illustrating a structure of a physical layer protocol data unit (PPDU) used in an 802.11ay system according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
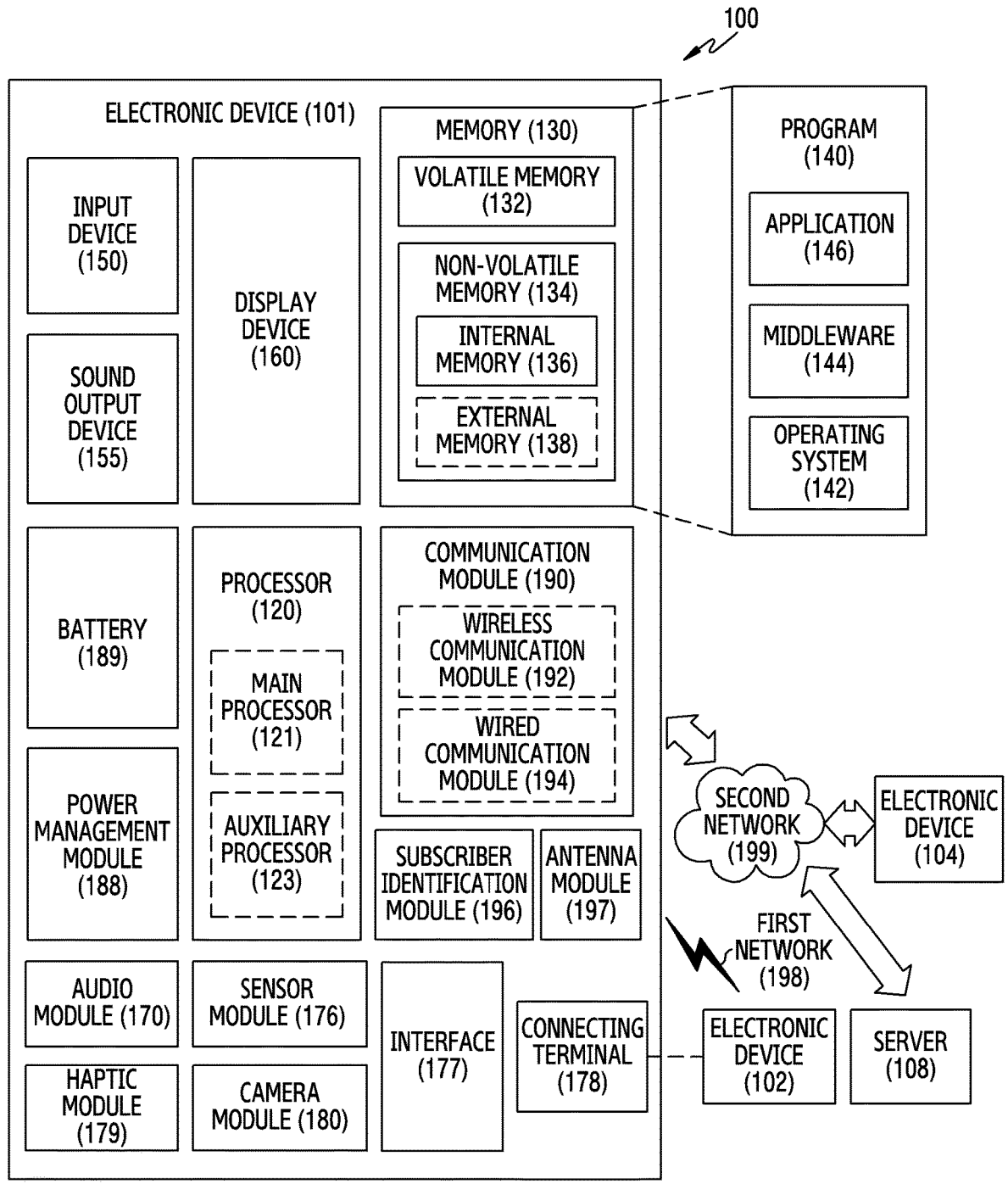
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
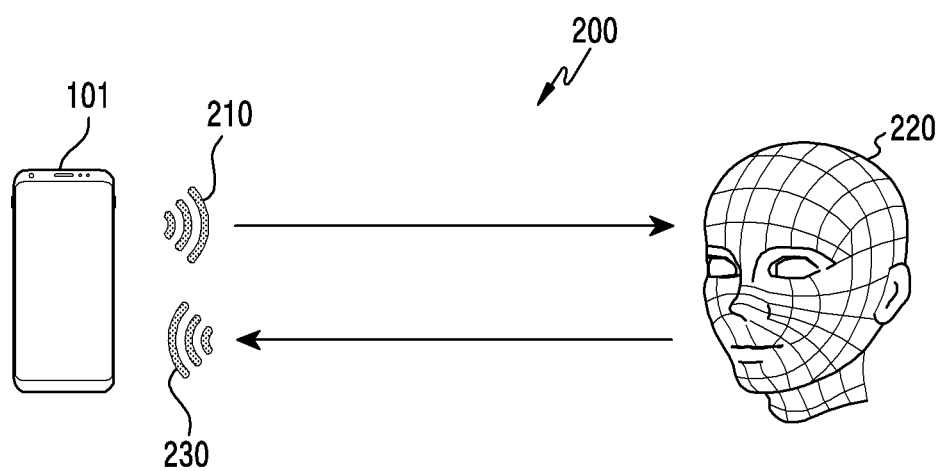
FIG. 2 is a diagram illustrating various embodiments to which a method proposed herein is applied according to an embodiment of the disclosure.

FIG. 2 is a diagram 200 illustrating various embodiments to which a method proposed herein is applied according to an embodiment of the disclosure.

Referring to FIG. 2, an electronic device 101 transmits a signal 210 through a wireless communication system (e.g., the communication module 190 in FIG. 1) and receives a signal 230 reflected from an object 220, and may measure the distance to the object 220 using the difference between the reception time of the reflected signal 230 and the transmission time of the transmitted signal 210. However, there is a limit to a measurement resolution that can be provided by the electronic device 101, and thus it is necessary to compensate for the measurement resolution.

The wireless communication system, which can be used in the embodiment illustrated in FIG. 2, may be an 802.11n or 802.11ac system, or an 802.11ad or 802.11ay system capable of supporting a higher wireless data transmission amount.

The 802.11n or 802.11ac system is capable of transmitting a signal using a 20, 40, 80, or 160 MHz bandwidth in the existing 2.4 GHz or 5 GHz frequency band, and the method proposed herein may be applicable thereto even though the distance measurement resolution may be low.

The 802.11ad system or the 802.11ay system, which is configured by extending the 802.11ad system, may use a wide bandwidth of several GHz using a 60 GHz frequency band. The 802.11ad system is capable of supporting a single bandwidth up to 2.16 GHz, and the 802.11ay system is capable of using a much wider bandwidth of up to 8.64 GHz. The 802.11ay system is capable of obtaining a higher resolution and/or accuracy in measurement in proportion to the bandwidth using a wide bandwidth of several GHz band. However, considering that the maximum bandwidth defined in the standard is 4.32 GHz, the resolution and/or accuracy may be limited to 4.28 cm.

Hereinafter, various embodiments will be mainly described based on an 802.11ad or 802.11ay system, but the wireless communication system used in this disclosure is not limited thereto, and other wireless communication systems may be used. Furthermore, methods proposed herein may be similarly applicable thereto.

FIG. 3A is a diagram illustrating a structure of a physical layer protocol data unit (PPDU) 310 used in an 802.11ad system according to an embodiment of the disclosure.

FIG. 3B is a diagram illustrating a structure of a physical layer protocol data unit (PPDU) 350 used in an 802.11ay system according to an embodiment of the disclosure.

Referring to FIG. 3A, the PPDU 310 of the 802.11ad system may include six fields of a short training field (STF) 311, a channel estimation field (CEF) 313, a header field 315, a data field 317, an automatic gain control (AGC) field 319, and a receive/transmit training (TRN) field 321. The STF 311 may be used for synchronization, the CEF 313 may be used for channel estimation, the data field 317 may contain data to be transmitted, and the AGC field 319 and the TRN field 321 may be used for beam enhancement and beam tracking. The header field 315 may include a number of fields that describe the PPDU 310 to be transmitted, and may be changed depending on the form in which the PPDU 310 is transmitted. An example of the form in which the PPDU 310 is transmitted may include a control physical layer, an orthogonal frequency division multiplexing (OFDM) physical layer, and a single carrier (SC) physical layer.

Referring to FIG. 3B, the PPDU 350 used in the 802.11ay system includes the fields 311, 313, and 315 of the PPDU 310 used in the 802.11ad system for backward compatibility with the 802.11ad system as they are. In order to distinguish the fields 311, 313, and 315 of the 802.11ad system PPDU 310 of the related art from newly added fields 363, 365, 367, an 369, "L" indicating "legacy" may be added in front of the field names, and thus the fields may be referred to as L-STF 351, L-CEF 353, and L-Header 355, respectively. In addition, the PPDU 350 used in the 802.11ay system may include a signaling field required for supporting features added to the 802.11ay system, such as channel bonding or multi-input multi-output (MIMO) in addition to the fields of the PPDU 310 of the 802.11ad system. For this purpose, as illustrated in FIG. 3B, the PPDU 350 of the 802.11ay system may additionally include an EDMG-Header-A field 363, an EDMG-STF 365, an EDMG-CEF 367, and an EDMG-Header-B field 369 between the legacy header field 355 and the data field 357. Here, "enhanced directional multi-gigabit (EDMG)" is a term added in order to indicate the main features of the 802.11ay system. The EDMG-STF 365 and the EDMG-CEF 367 are intended to perform functions similar to those of the L-STF 351 and the L-CEF 353, and the EDMG-Header-A field 363 and the EDMG-Header-B field 369 may include a number of fields describing the PPDU 350 to be transmitted. FIG. 3B also illustrates an automatic gain control (AGC) field 359 (similar to the AGC field 319 illustrated in FIG. 3A).

The electronic device 101 may transmit a Golay sequence in the CEF 313 or the L-CEF 353 and the EDMG-CEF 367 of the PPDU 310 or 350 illustrated in FIGS. 3A and 3B, and an electronic device receiving the PPDU 310 or 350 may perform channel estimation required to normally receive data symbols transmitted in the data field 317 or 357 using the Golay sequence.

Figure 4:
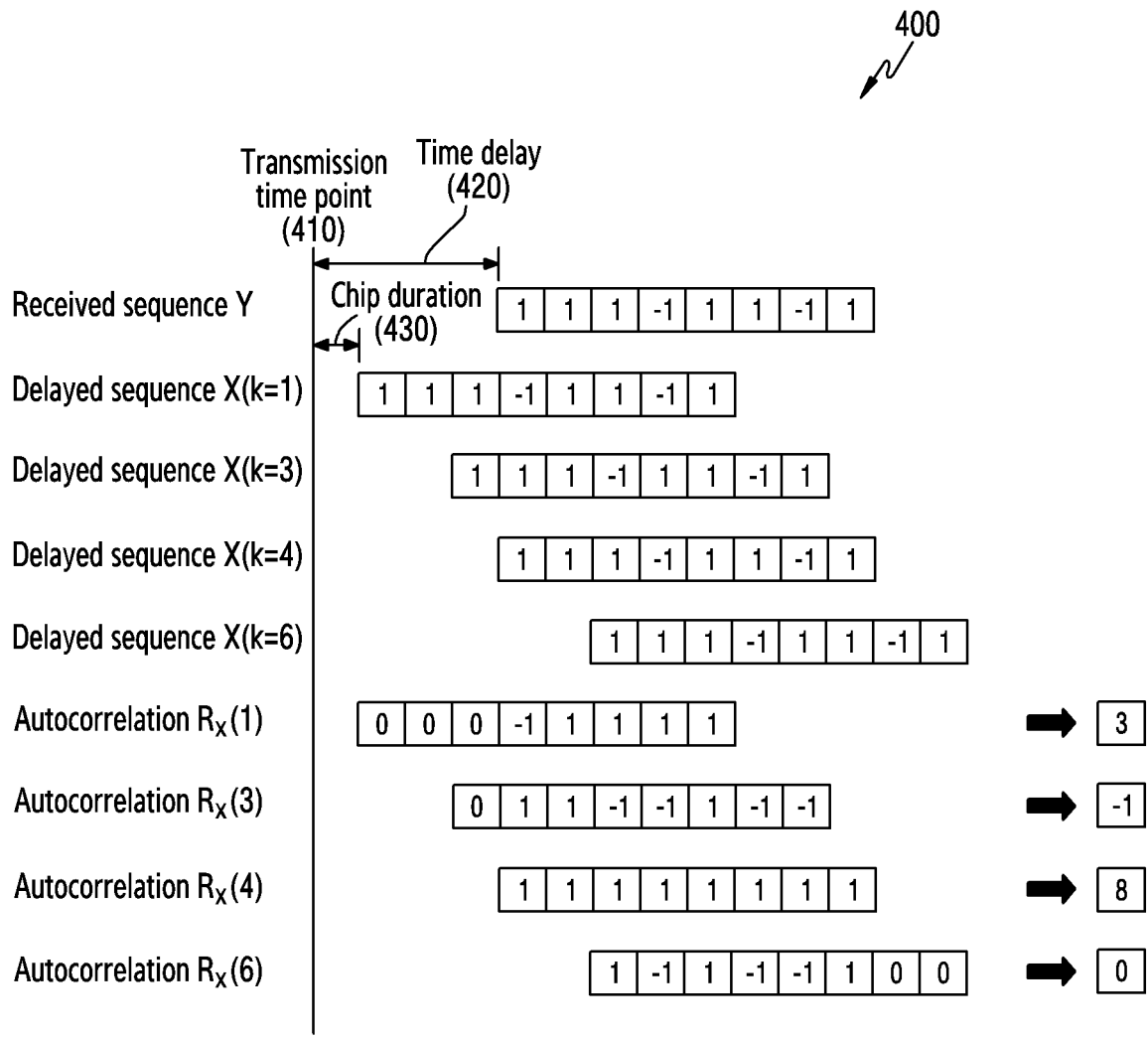
FIG. 4 is a diagram illustrating an example of calculating an autocorrelation according to an embodiment of the disclosure.

FIG. 4 is a diagram 400 illustrating an example of calculating an autocorrelation according to an embodiment of the disclosure.

A sequence X having a length of N (e.g., 8) is given, the electronic device 101 may transmit a signal including the sequence X at a transmission time point 410, the transmitted signal may be reflected from an object to be recognized, and the electronic device 101 may receive a reflected signal including a sequence Y. The signal received by the electronic device 101 may be received after being delayed by a specific time (e.g., 4*chip duration) 420 from the transmission time point 410. Here, the chip duration 430 may mean a time taken to transmit one chip or one symbol, and may have a value that is inversely proportional to the bandwidth in which the signal is transmitted. In order to determine the time delay 420 undergone by the received sequence Y, the electronic device 101 may calculate an autocorrelation ($R_x(k)$) between the received sequence Y and a delayed sequence X(k) obtained by delaying the sequence X by k*chip duration. The autocorrelation may be calculated as a sum of products of corresponding components of two sequences, and may be expressed as an equation of $R_x(k) = \sum_{j=1}^{N} X_j(k) Y_j$. Here, Y is a received sequence, which is included in a reflected signal and corresponds to a signal obtained when X is delayed by a specific time, and X(k) is a signal obtained when the sequence X is delayed by k*chip duration from the transmission time point 410.

When calculating the autocorrelation between the sequence X (k=1) in the case where k=1 and the received sequence Y with reference to FIG. 4, since the received sequence Y does not yet arrive during the first three chips (j=1, 2, 3), the value of Y is 0, and the value of $X_j(k)Y$ also becomes 0. During the chip durations thereafter (j=4, 5, 6, 7, and 8), the received sequence Y arrives, and thus $X_j(k)$ and $Y_j$ have a value of −1 or 1, and the final autocorrelation ($R_x(1)$) obtained by summing these calculated values has a value of 3.

Similarly, the electronic device 101 may calculate and autocorrelations for other values of k.

Referring to FIG. 4, the autocorrelations may have values of $R_x(3)=-1$, $R_x(4)=8$, and $R_x(6)=0$. Although not illustrated in FIG. 4, the autocorrelations may be calculated for other values of k. In addition, the electronic device 101 may estimate a delay time till the recognized object using a value of k when the autocorrelation value is a peak among the autocorrelation values calculated for respective values of k. Referring to the example of FIG. 4, when k is 4, the autocorrelation has a value of 8, and thus becomes the peak, the electronic device 101 may estimate the delay time until the signal transmitted at the transmission time point 410 is received by being reflected and returned from the recognized object as 4*chip duration.

According to various embodiments, in the case where a Golay sequence is used as the sequence X, when the delay time is 0, that is, when two signals for which the correlation is to be calculated have the same sequence, the correlation becomes a peak, and thus the autocorrelation has the maximum value. In contrast, when the delay time is not 0, that is, when two signals for which the correlation is to be calculated are deviated by a delay, the correlation has a value of 0 or a smaller value, and thus the electronic device 101 may easily obtain the delay time using the autocorrelation. According to another embodiment, in the case where a sequence called a Golay complementary sequence or a Golay pair is used as a sequence X, the autocorrelation has a property that, when the delay time is 0, the autocorrelation has a large value, and when the delay time is not 0, the autocorrelation is 0, and thus the electronic device 101 is capable of more easily acquiring the delay time.

Figure 5A:
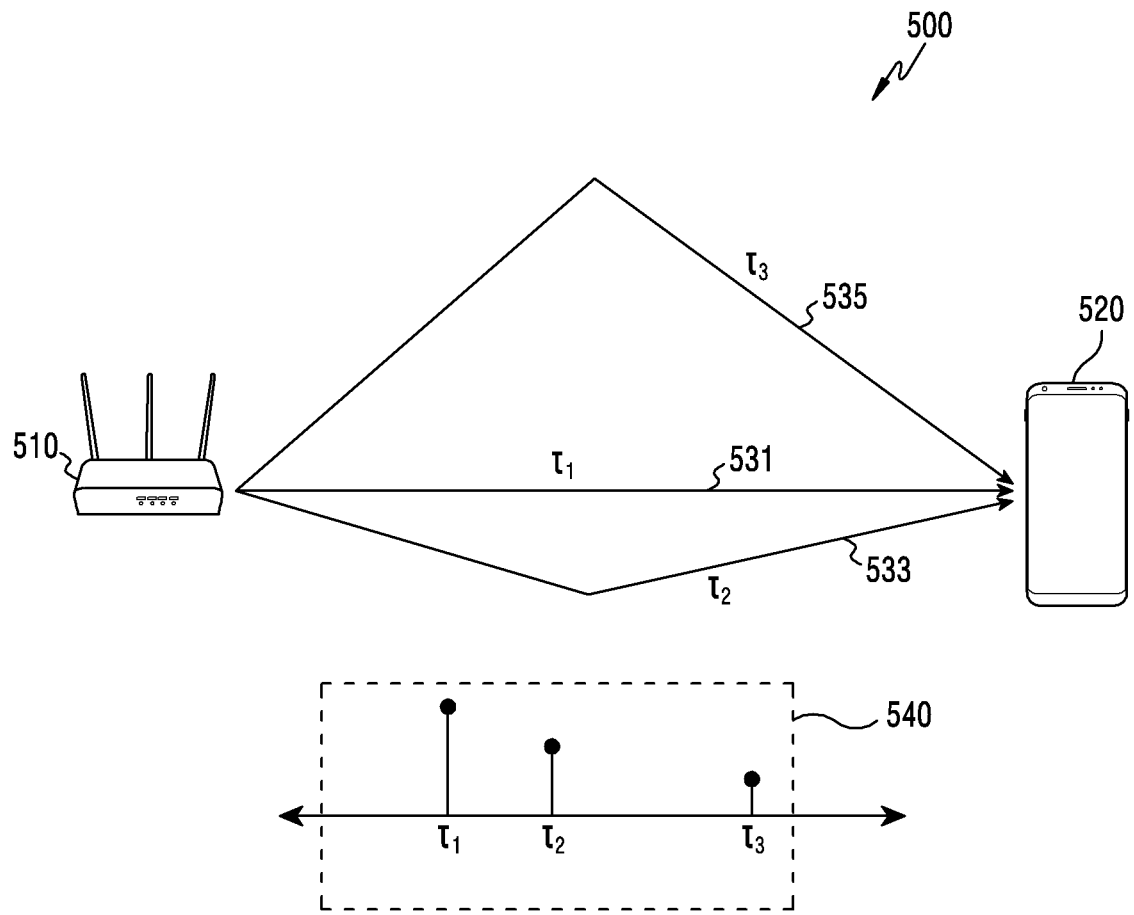
FIG. 5A is a diagram illustrating channel estimation using a Golay sequence according to an embodiment of the disclosure.

FIG. 5A is a diagram 500 illustrating channel estimation using a Golay sequence according to an embodiment of the disclosure.

Referring to FIG. 5A, it is assumed that three channel paths having different delay times can be set between a transmission device 510 and a reception device 520. When the transmission device 510 transmits a Golay sequence, the Golay sequence transmitted to the reception device 520 arrives at the reception device via three channel paths 531, 533, and 535. Then, the reception device 520 receives signals including multiple path components having a plurality of delay times, signal magnitudes, and phases. As illustrated in FIG. 4, the reception device 520 calculates correlations with respect to various delay times, and acquires peaks at the same time points 540 as the delay times of the multiple path components. The reception device 520 may also acquire signal attenuations and phase values of the corresponding channels at the time points when the correlation values become peaks. Based on this information, the reception device 520 may acquire channel information or channel impulse response (CIR) required for data reception.

The 802.11ad and 802.11ay systems include a Golay sequence in a CEF (e.g., CEF 313, L-CEF 353, or EDMG-CEF 367) such that the reception device is capable of performing channel estimation. Accordingly, the electronic device 101 including the wireless communication module 192, which supports the 802.11ad and 802.11ay systems, may transmit a PPDU 310 or 350 including the Golay sequence so as to perform distance measurement. When the PPDU 310 or 350 is transmitted for distance measurement, the electronic device 101 may not use the data field 317 or 357 or may only load short information therein for a certain specific purpose in order to reduce overhead. In another embodiment, even when the PPDU 310 or 350 is used for general data transmission, channel estimation is possible since the Golay sequence is included in the CEF. In this case, the data field 317 or 357 may include data to be transmitted. The electronic device 101 intended to implement a radar function using the signals of the 802.11ad and 802.11ay systems may transmit a PPDU 310 or 350 including a Golay sequence, and may receive a signal reflected and returned from a surrounding object. As described above, the electronic device 101 may estimate CIR using a correlation feature of the Golay sequence or the Golay pair. By calculating the correlations between the transmitted Golay sequence and received signals for various delay times after transmitting the PPDU 310 or 350 including the Golay sequence, the electronic device 101 may acquire a correlation value which serves as a peak in a time delay of each received channel component, and may estimate the CIR by acquiring the signal magnitude and phase information of the corresponding signal component at the corresponding time delay.

Assuming that a delay time, corresponding to a peak of the correlation between a signal received by being reflected from a specific object and a transmitted signal, is τ and the speed of an electromagnetic wave is $V_1$, the distance traveled by the electromagnetic wave until the signal transmitted from the electronic device 101 is received by being reflected from the object is $V_1*\tau$. Since this distance corresponds to a reciprocating distance to the corresponding object, the electronic device 101 may estimate that the object is at a distance of $(V_1*\tau)/2$. Here, the resolution of τ may be determined by a chip duration.

When the electronic device 101 is used as a radar using a wireless signal of the 802.11ay, distance estimation may be performed using the correlation feature of the Golay sequence described in the example of FIG. 4. As illustrated in FIG. 4, because the delay time τ at which the correlation value becomes a peak is found by delaying the transmitted Golay sequence in units of chip duration and calculating the correlation between the transmitted Golay sequence and the received Golay sequence, the resolution of the delay time may be determined based on the chip duration. Assuming that the chip duration is $T_c$ and the speed of an electromagnetic wave is $V_1$ in order to convert the resolution of the delay time to the resolution of the distance, the distance traveled by the electromagnetic wave during the chip duration is $T_c*V_1$. Since the signal transmitted from the wireless communication device is received after reciprocating the distance to the object 200, the resolution of the distance may be $(V_1*T_c)/2$.

In an embodiment, the wireless communication scheme defined in the 802.11ay supports channel bonding, so that the bandwidth can be used from 2.16 GHz up to 8.64 GHz, and the chip duration is inversely proportional to the bandwidth, and may thus have a value from 0.57 ns to 0.14 ns. Substituting this into the above equation, a radar using a wireless signal of the 802.11ay may have the resolutions as shown in Table 1 depending on the bandwidths.

TABLE 1

| Bandwidth | 2.16 GHz | 4.32 GHz | 6.48 GHz | 8.64 GHz |
|---|---|---|---|---|
| Resolution | 8.55 cm | 4.28 cm | 2.85 cm | 2.14 cm |

Although the 802.11ay standard defines the bandwidth up to 8.64 GHz as described above, the bandwidth up to 4.32 GHz is defined as a bandwidth that should be mandatorily supported and the larger bandwidth is defined as an optional bandwidth. Since most of available chipsets generally support only the bandwidth that should be mandatorily supported, a radar function based on a wireless signal of the 802.11ay may be basically set to have a distance resolution of about 4.28 cm. However, certain applications may require a fairly high resolution or accuracy to estimate positions in precise units of 1 cm and to perform a specific operation for each position.

As described above, since the 802.11ay wireless communication scheme using a wide bandwidth is generally capable of providing a resolution of about 4.28 cm, it may be impossible to provide the performance required for an application requiring a higher accuracy or resolution. An interpolation method may be used in order to somewhat improve a distance estimation accuracy.

Figure 5B:
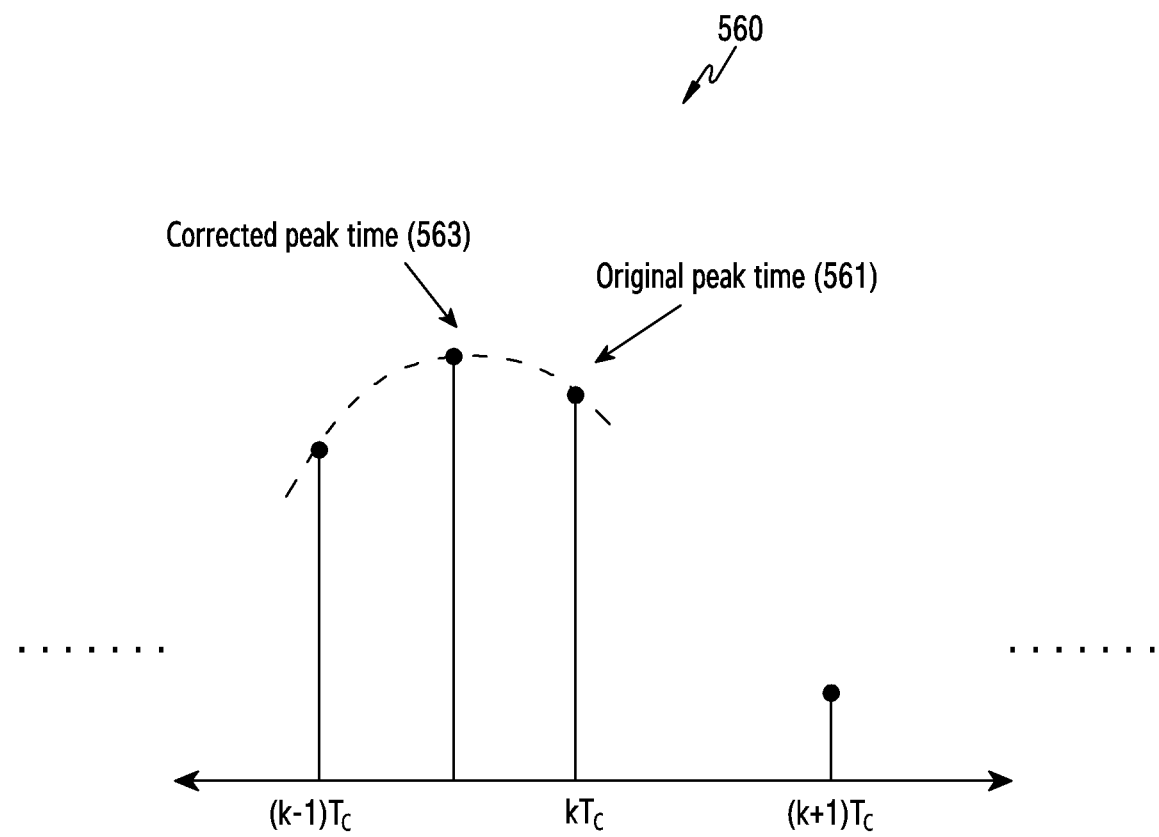
FIG. 5B is a diagram for describing an interpolation method according to an embodiment of the disclosure.

FIG. 5B is a diagram 560 for describing an interpolation method according to an embodiment of the disclosure.

Referring to FIG. 5B, it illustrates a part of CIR estimated through a Golay sequence correlation as illustrated in FIG. 4. As described above, since the correlation calculation is performed on a delayed Golay sequence in the units of chip duration and a received Golay sequence, the correlation may be calculated in the units of chip duration $T_c$, as illustrated in FIG. 5B. If a maximum peak value is obtained at the k-th tap (delay) (561) as in the embodiment of FIG. 5B, the distance to the object may be basically estimated as $(V_1*k*T_c)/2$. However, as illustrated in FIG. 5B, an interpolation method may be performed using values at adjacent taps in order to improve the distance estimation accuracy. If the position of the corrected maximum peak value is changed to the corrected peak time T' (563) after performing the interpolation method as in the embodiment of FIG. 5B, the estimated distance to the object may be determined to be $(V_1*T')/2$. As illustrated in FIG. 5B, the use of the interpolation method may slightly improve the distance estimation accuracy. However, since the interpolation method is also an approximation, there is a limit in improving the distance estimation accuracy. In order to satisfy the requirements of various applications that require a higher distance estimation accuracy, a technique capable of further improving the distance estimation accuracy is required.

Figure 6:
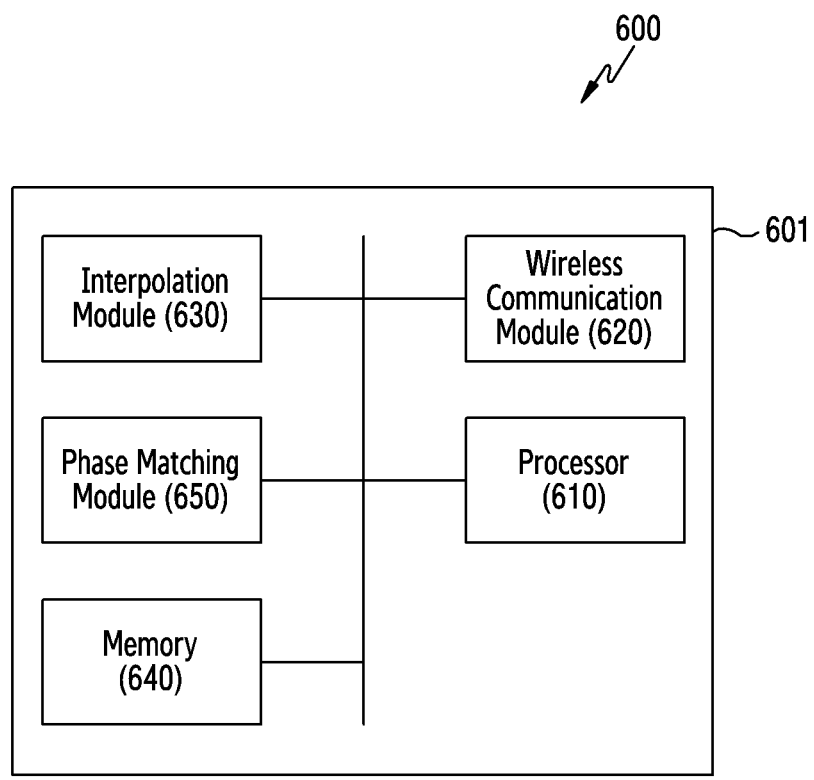
FIG. 6 is a block diagram illustrating a functional configuration of an electronic device according to an embodiment of the disclosure.

FIG. 6 is a block diagram 600 illustrating a functional configuration of an electronic device according to an embodiment of the disclosure. FIG. 6 briefly illustrates a functional configuration required to implement the method presented herein.

Referring to FIG. 6, an electronic device 601 (e.g., the electronic device 101) may include a processor 610 (e.g., the processor 120 in FIG. 1), a wireless communication module 620 (e.g., the wireless communication module 192 in FIG. 1), an interpolation module 630, a phase matching module 650, or a memory 640 (e.g., the memory 130 in FIG. 1). However, without being limited thereto, at least one of the above-mentioned components may be omitted from the electronic device 601, or other components may be added to the electronic device 601.

In the following description, the functions of the wireless communication module 620, the interpolation module 630, or the phase matching module 650 are described as being performed in each module, but are not limited thereto. All or some functions of the wireless communication module 620, the interpolation module 630, or the phase matching module 650 may be implemented by at least one processor 610.

According to various embodiments, the memory 640 may store instructions to be executed by the processor 610 in order to implement operations suggested by the method of this disclosure to be described below. In addition, the memory 640 may be used when executing an application that requires a distance estimation accuracy by applying the method for improving the distance measurement accuracy proposed herein.

According to various embodiments, the wireless communication module 620 may transmit and receive signals according to a wireless communication scheme such as the 802.11n, the 802.11ac, the 802.11ad, or the 802.11ay. In an embodiment, the wireless communication module 620 may generate a signal corresponding to the PPDU 310 or 350 illustrated in FIG. 3A or 3B in order to estimate the distance to an object in the vicinity thereof, and may emit the signal through at least one antenna. The wireless communication module 620 may emit a signal in a specific direction using beamforming, or may omnidirectionally emit the signal.

According to various embodiments, the wireless communication module 620 may cause a Golay sequence or a Golay complementary sequence to be included in a CEF (e.g., the CEF 313, the L-CEF 353, or the EDMG-CEF 367) of the PPDU 310 or 350 that is generated to implement a radar function. Alternatively, the wireless communication module 620 may insert a sequence, specifically designed in order to implement a radar function, into the data field 317 or 357 of the PPDU 310 or 350.

According to various embodiments, the wireless communication module 620 may acquire a delay time at which a correlation value becomes the peak through the correlation calculation illustrated in FIG. 4 for a Golay sequence or a Golay complementary sequence included in the PPDU 310 or 350. Alternatively, the wireless communication module 620 may calculate and store correlation values at respective delay times ($k*T_c$ (k is a positive integer)), and when two or more correlation values having a predetermined value or more exist at each delay time ($k*T_c$), the communication module 620 may control the interpolation module 630 to use an interpolation method. The processor 610 may also perform control such that the interpolation method is executed.

According to various embodiments, the interpolation module 630 may estimate a delay time or a distance with a more improved accuracy by applying the interpolation method based on a correlation value at each delay time acquired from the wireless communication module 620. When there are at least two consecutive correlation values, which are obtained using the method illustrated in FIG. 5B and are equal to or greater than a preset value, the interpolation module 630 is capable of improving the accuracy of the estimated delay time or the estimated distance by performing the interpolation method illustrated in FIG. 5B under the control of the processor 610 or the wireless communication module 620.

Figure 7:
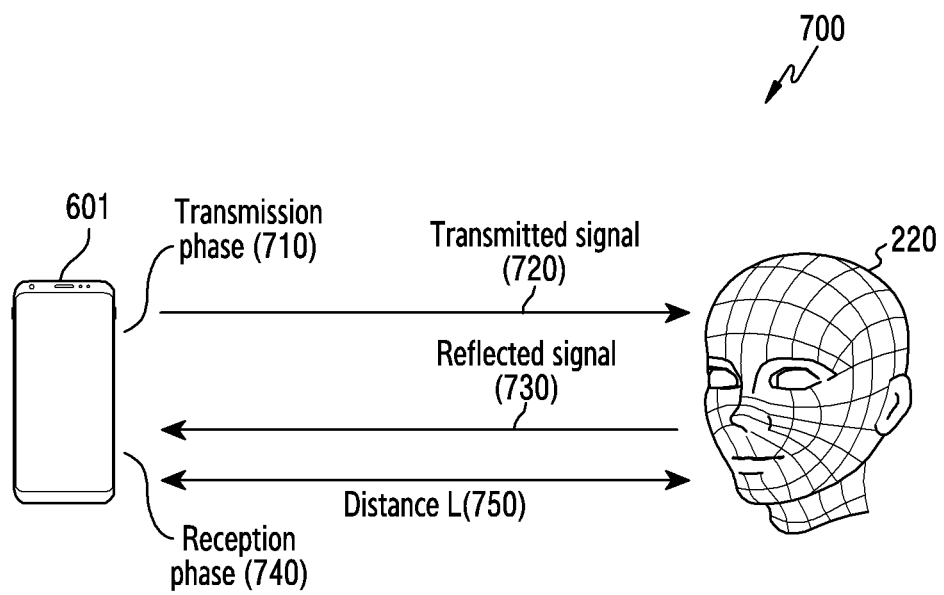
FIG. 7 is a diagram for describing an operation of acquiring a phase of a received signal by a wireless communication module according to an embodiment of the disclosure.

FIG. 7 is a diagram 700 for describing an operation of acquiring a phase of a received signal by the wireless communication module 620 according to an embodiment of the disclosure.

According to an embodiment, if the wavelength of an electromagnetic wave is λ in a medium, the phase of the electromagnetic wave changes by 2πL/λ radians when the electromagnetic wave propagates through the medium by a distance L.

Referring to FIG. 7, assuming that the transmission phase 710 of a transmitted signal 720 at the transmission time point at which the transmitted signal 720 is transmitted from an electronic device 601 (e.g., the electronic device 101 in FIG. 1) is $\theta_T$, the reception phase 740 of a reflected signal 730 reflected from an object 220 at the reception time point at which the reflected signal 730 is received is $\theta_R$, and the distance 750 between the electronic device 601 and the object 220 is L, the total distance the electromagnetic wave is propagated in the medium becomes 2L, and thus the total phase change of 2π*2L/λ radians occurs during the propagation of the electromagnetic wave in the medium. In addition, even when the electromagnetic wave is reflected from the object, a phase change occurs. The phase change may have a value of π or 0 depending on a difference in refraction coefficient between the medium and the object 220. When the electronic device 601 radiates a wireless signal, the medium is air, and air has a refractive index smaller than refractive indexes of most objects 220. Accordingly, in general use, the transmitted signal 720 is reflected while undergoing the phase change of π when reflected from the object 220.

Accordingly, in the embodiment of FIG. 7, a relationship of $$\theta_R = \theta_T + \frac{2\pi * 2L}{\lambda} + \pi$$

is established. Here, since the wavelengths (λ) of the transmitted signal 720 and the reflected signal 730 propagated in the medium have theoretically given values, if the phase 710 at the time of transmitting the transmitted signal 720 and the phase 740 at the time of receiving the reflected signal 730 are known, the relationship between these two signals is only affected by the distance L between the electronic device 601 and the object 220. In addition, the phase 710 at the transmission time point may be fixed and used (e.g., 0 radians) according to the setting of the electronic device 601. Therefore, when the phase at the reception time point of the reflected signal 730 is acquired, it is possible to determine the distance L between the electronic device 601 and the object 220.

According to an embodiment, the wireless communication module 620 may acquire the phase of the received signal by separating the received signal into an I (in-phase) signal and a Q (quadrature-phase) signal and performing modulation.

According to various embodiments, the phase matching module 650 may further improve the accuracy of the estimated distance to the object 220 based on the phases of the transmitted signal and the received signal. To this end, the phase matching module 650 may use the phases of the transmitted signal and the received signal, which have been obtained by the wireless communication module 620. According to another embodiment, the phase of the transmitted signal may be preset without needing to be acquired by the wireless communication module 620.

Figure 8:
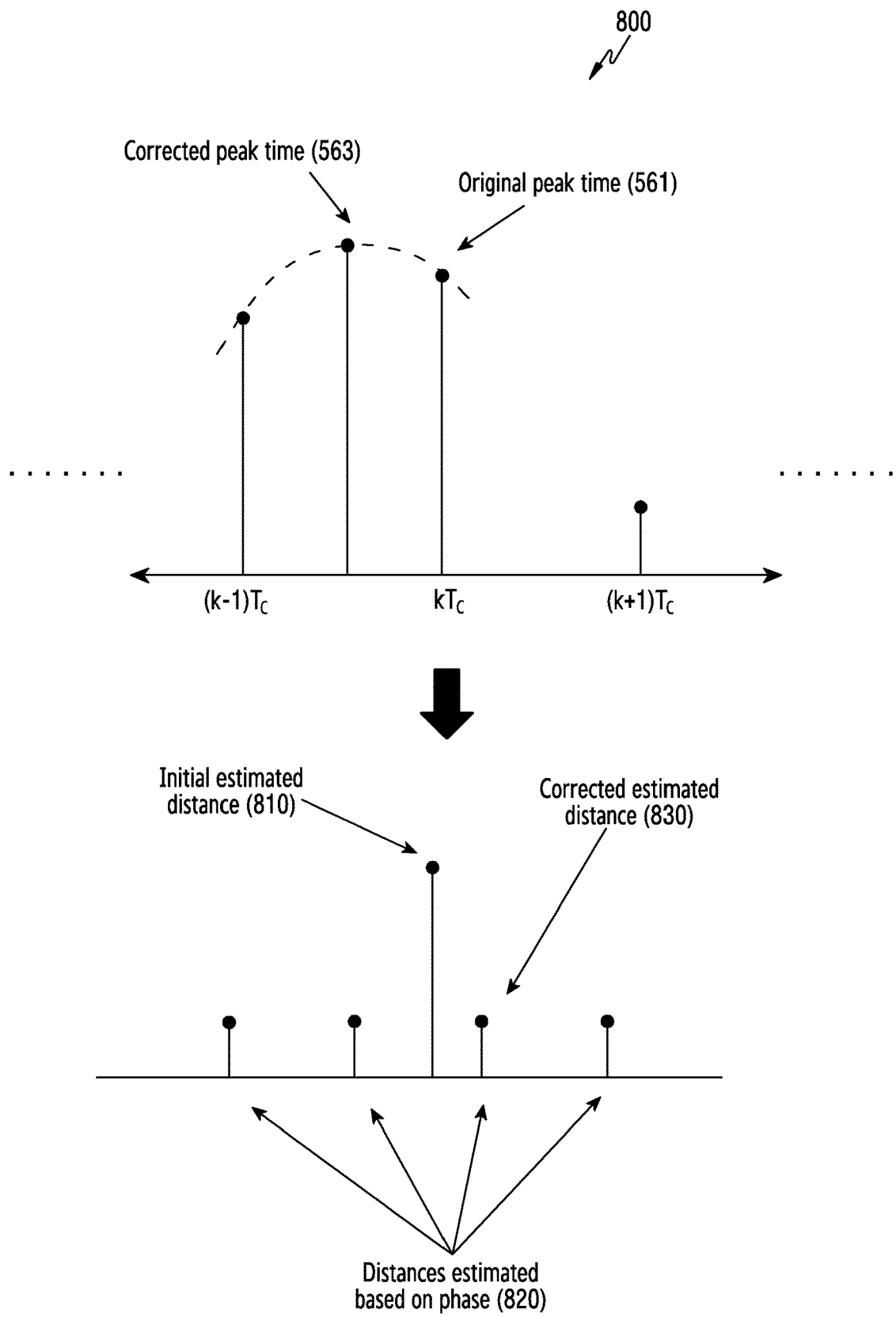
FIG. 8 is a diagram illustrating an example of determining an estimated distance by reflecting a distance estimated by a phase matching module based on the phases of a transmitted signal and a received signal according to an embodiment of the disclosure.

FIG. 8 is a diagram 800 illustrating an example of determining an estimated distance by reflecting a distance estimated by the phase matching module 650 based on the phases of the transmitted signal and the received signal according to an embodiment of the disclosure.

Referring to FIG. 8, if a corrected peak time (563) T' is acquired by performing correlation calculation by the wireless communication module 620 and additionally performing interpolation by the interpolation module 630, the first estimated distance (810) at which the object is located may be determined by L1=(V$_1$*T')/2.

According to various embodiments, the phase matching module 650 may obtain phase-based estimated distances 820

$$L2 = \frac{(\theta_R - \theta_T - \pi + 2n\pi) \times \lambda}{4\pi}$$

based on the phase of the transmitted signal ($\theta_T$), the phase of the received signal ($\theta_R$), and the wavelengths of the signals ($\lambda$) acquired by the wireless communication module 620. Here, the reason why $2n\pi$ (in which n is an integer) is added is that the phase repeats for each $2\pi$ and returns to its original value. According to another embodiment, the phase of the transmitted signal may be set to a fixed value (e.g., 0), which makes it possible to more simply calculate the phase-based estimated distances 820.

According to various embodiments, all or some of the functions performed in the above-described phase matching module 650, the above-described interpolation module 630, or the above-described wireless communication module 620 may be executed by the processor 610. Alternatively, the functions may be executed in respective modules under the control of the processor 610.

The electronic device 601 is capable of more accurately acquiring the finally estimated distance 830 to the object by comparing the distance to the object, acquired using the time delay of the transmitted signal and the reflected signal and an additional interpolation method, and the distance to the object, acquired based on the phases of the transmitted signal and the received signal. Based on this, the electronic device 601 may apply the distance acquired by applying the above-described method to an application requesting a fairly high distance accuracy.

According to various embodiments, an electronic device (e.g., the electronic device 101 in FIG. 1 or the electronic device 601 in FIG. 6) may include: a wireless communication module (e.g., the wireless communication module 192 in FIG. 1 or the wireless communication module 620 in FIG. 6) configured to transmit a wireless communication signal to an external object and receive a signal reflected from the external object; a phase matching module (e.g., the phase matching module 650 in FIG. 6) configured to estimate a distance to the external object based on phases of the transmitted signal and the received signal; at least one processor (e.g., the processor 120 in FIG. 1 or the processor 610 in FIG. 6) operatively connected to the phase matching module and the wireless communication module; and at least one memory (e.g., the memory 130 in FIG. 1 or the memory 640 in FIG. 6) operatively connected to the at least one processor. The at least one memory may store instructions that, when executed, cause the at least one processor to: control the wireless communication module to transmit the wireless communication signal to the external object; control the wireless communication module to receive a signal returned when the transmitted wireless signal is reflected from the external object; acquire a first distance to the external object based on a transmission time point of the transmitted signal and a reception time point of the received signal; acquire a second distance to the external object based on phases of the transmitted signal and the received signal by controlling the phase matching module; and estimate a distance to the external object based on the first distance and the second distance.

According to various embodiments, the instructions may cause the at least one processor to: calculate correlation values between a delayed signal and the received signal by chip duration units from the transmission time point of the transmitted signal; acquire a delay time based on a time point having a peak value among the correlation values; and acquire the first distance based on the delay time.

According to various embodiments, the instructions may cause the at least one processor to acquire the delay time by applying an interpolation method when the correlation values equal to or greater than a preset threshold exist at two or more time points.

According to various embodiments, the instructions may cause the at least one processor to: control the wireless communication module to separate an I (in-phase) signal and a Q (quadrature-phase) signal from the received signal; and acquire phase information of the received signal based on the I signal and the Q signal.

According to various embodiments, the instructions may cause the at least one processor to acquire a plurality of second distances to the external object based on a phase of the transmitted signal ($\theta_T$), a phase of the received signal ($\theta_R$), and wavelengths of the transmitted signal and the received signal ($\lambda$) and using equation $$\frac{(\theta_R - \theta_T - \pi + 2n\pi) \times \lambda}{4\pi}$$

(in which n is an integer).

According to various embodiments, the instructions may cause the at least one processor to estimate the second distance closest to the first distance among the acquired plurality of second distances as the distance to the external object.

According to various embodiments, the instructions may cause the at least one processor to preset the phase of the transmitted signal ($\theta_T$); control the wireless communication module to transmit a wireless communication signal having the preset phase; and acquire the plurality of second distances using the preset phase of the transmitted signal ($\theta_T$).

According to various embodiments, the wireless communication module may be operated according to a wireless communication scheme of 802.11ad or 802.11ay, the signal may include a physical lay protocol data unit (PPDU) of the 802.11ad or the 802.11ay, and the PPDU may include a Golay sequence or a Golay complementary sequence in order to assist in acquisition of channel impulse response.

According to various embodiments, an electronic device (e.g., the electronic device 101 in FIG. 1 or the electronic device 601 in FIG. 6) may include: a wireless communication module configured to transmit a wireless communication signal and receive a signal returned when the transmitted wireless communication signal is reflected from an external object; a phase matching module configured to estimate a second distance to the external object based on phases of the transmitted communication signal and the received signal; at least one processor operatively connected to the phase matching module and the wireless communication module; and at least one memory operatively connected to the at least one processor. The at least one memory may store instructions that, when executed, cause the at least one processor to: acquire a first distance to the external object based on a transmission time point of the transmitted signal and a reception time point of the received signal; and estimate a distance to the external object based on the first distance and the second distance.

According to various embodiments, the phase matching module may be configured to separate an I (in-phase) signal and a Q (quadrature-phase) signal from the received signal; and acquire phase information of the received signal based on the I signal and the Q signal.

According to various embodiments, the phase matching module may be configured to acquire a plurality of second distances to the external object based on a phase of the transmitted signal ($\theta_T$), a phase of the received signal ($\theta_R$), and wavelengths of the transmitted signal and the received signal ($\lambda$) and using equation $$L2 = \frac{(\theta_R - \theta_T - \pi + 2n\pi) \times \lambda}{4\pi}$$

(in which n is an integer).

According to various embodiments, the instructions may cause the at least one processor to: preset the phase of the transmitted signal ($\theta_T$); control the wireless communication module to transmit a wireless communication signal having the preset phase, and the phase matching module acquire the plurality of second distances using the preset phase of the transmitted signal ($\theta_T$).

Hereinafter, a method for accurately measuring a distance from the electronic device 101 or 601 to an object using the above-described electronic device (e.g., the electronic device 101 in FIG. 1 or the electronic device 601 in FIG. 6) will be described.

Figure 9:
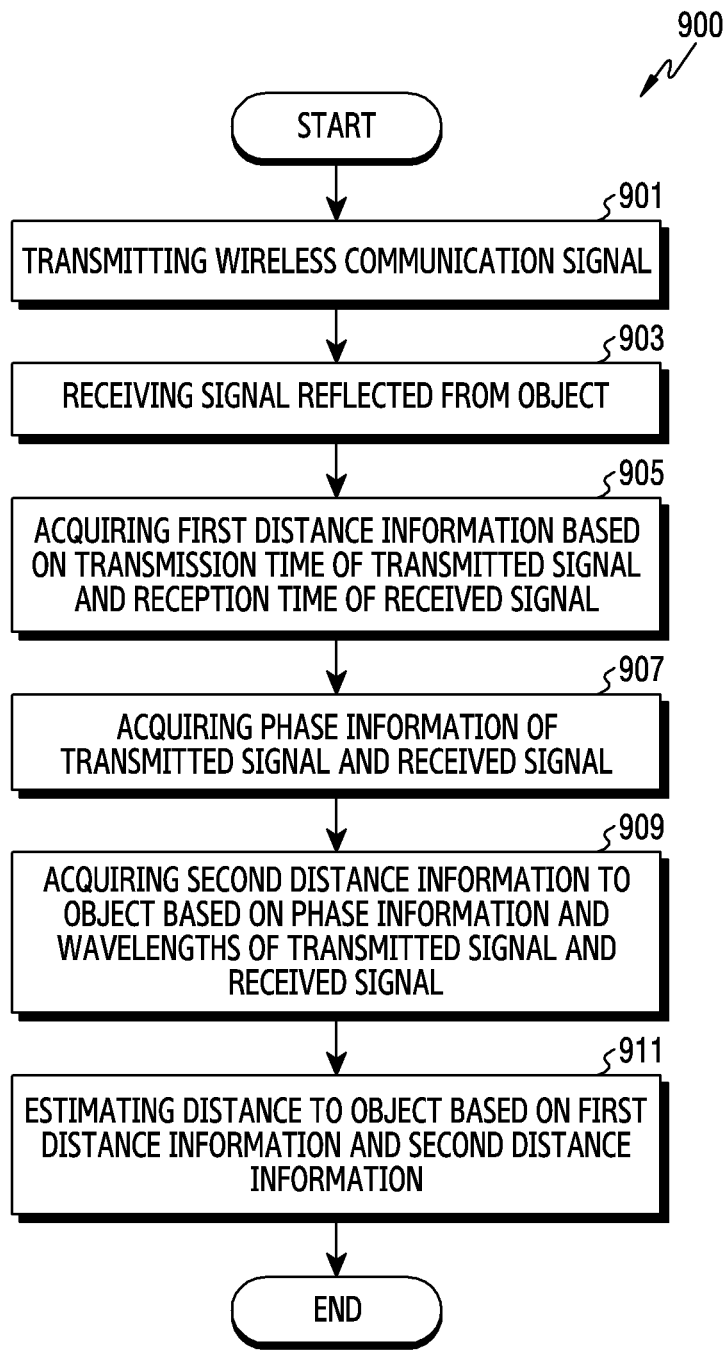
FIG. 9 is a flowchart illustrating operations of measuring a distance to an object by an electronic device according to an embodiment of the disclosure.

FIG. 9 is a flowchart 900 illustrating operations of measuring a distance to an object by an electronic device according to an embodiment of the disclosure. It may be understood that the operation subject of the flowchart 900 illustrated in FIG. 9 is an electronic device (e.g., the electronic device 101 in FIG. 1 or the electronic device 601 in FIG. 6) or a processor (e.g., the processor 120 in FIG. 1 or the processor 610 in FIG. 6) of the electronic device.

Referring to FIG. 9, in operation 901, the electronic device 101 or 601 may transmit a wireless communication signal (e.g., a signal including the sequence X transmitted at the transmission time point 410 in FIG. 6) through a wireless communication module (e.g., the wireless communication module 620 in FIG. 4) in order to detect the distance to the object. The signal transmitted from the electronic device 101 or 601 may include the PPDU 310 according to the 802.11ad wireless communication scheme illustrated in FIG. 3A or the PPDU 350 according to the 802.11ay wireless communication scheme illustrated in FIG. 3B, or may include a physical layer packet according to another wireless communication scheme. According to an embodiment, the CEF 313 included in the PPDU 310 according to the 802.11ad wireless communication scheme illustrated in FIG. 3A or the L-CEF 353 or the EDMG-CEF 367 included in the PPDU 350 according to the 802.11ay wireless communication scheme illustrated in FIG. 3B may be transmitted with a Golay sequence or a Golay complementary sequence for channel estimation loaded therein. When using another wireless communication scheme, the electronic device 101 or 601 may enable channel estimation by loading a Golay sequence or a sequence, capable of being used for another channel estimation, in the data field of a physical layer packet.

According to various embodiments, in operation 903, the electronic device 101 or 601 may receive, through the wireless communication module 620, a signal reflected from the object when the transmitted signal is reflected from the object for which a distance is to be measured (e.g., the object 220 in FIG. 2) in operation 901. The signal reflected from the object 220 may be received by the electronic device 101 or 601 after the transmitted signal undergoes a delay depending on twice the distance between the electronic device 101 or 601 and the object 220.

According to various embodiments, in operation 905, the electronic device 101 or 601 may calculate correlation values between the received signal (e.g., Y in FIG. 4) and signals (e.g., X(k)) obtained by delaying the transmitted signal by k times the chip duration (e.g., the chip duration 430 in FIG. 4), and may find k, at which the correlation value becomes peak (e.g., k=4 in FIG. 4), determining the delay time as k*chip duration ($T_c$). According to an embodiment, the electronic device 101 or 601 may calculate and store correlation values at respective delay times (k*$T_c$ (k is a positive integer)), and when two or more correlation values having a predetermined value or more exist at each delay time (k*$T_c$), the electronic device 101 or 601 may some more accurately estimate the delay time by applying an interpolation method.

According to various embodiments, in operation 907, the electronic device 101 or 601 may acquire phase information of the transmitted signal and the received signal. In an embodiment, the electronic device 101 or 601 may acquire phase information of each signal by separating and processing an I (in-phase) signal and a Q (quadrature-phase) signal of each of the transmitted signal and the received signal. According to another embodiment, since the transmitted signal is generated by the electronic device 101 or 601, the phase of the transmission signal may be preset (e.g., 0 radians).

The above-described operations 905 and 907 may be performed simultaneously, or when the operations are sequentially performed, any of them may be performed first.

According to various embodiments, in operation 909, the electronic device 101 or 601 may acquire information about a second distance to the object based on phase information ($\theta_T$, $\theta_R$) of the transmitted signal and the received signal, obtained in operation 907 and the wavelengths of the transmitted signal and the received signal ($\lambda$), and using equation $$L2 = \frac{(\theta_R - \theta_T - \pi + 2n\pi) \times \lambda}{4\pi}.$$

Here, the reason why $2n\pi$ (in which n is an integer) is added is that the phase repeats each $2\pi$ and returns to its original value. According to another embodiment, the phase of the transmitted signal may be set to a fixed value (e.g., $\theta_T=0$ or $-\pi$), which makes it possible to more simply calculate the phase-based estimated distances (e.g., the estimated distances 820 in FIG. 8). According to this, the second distance information may have a plurality of values depending on n.

According to various embodiments, in operation 911, the electronic devices 101 and 601 may estimate the distance to the object by comparing the first distance information acquired in operation 905 and the second distance information acquired in operation 909. In this case, the second distance closest to the first distance in the first information among the plurality of second distances in the second distance information may be estimated as the distance to the object.

Figure 10:
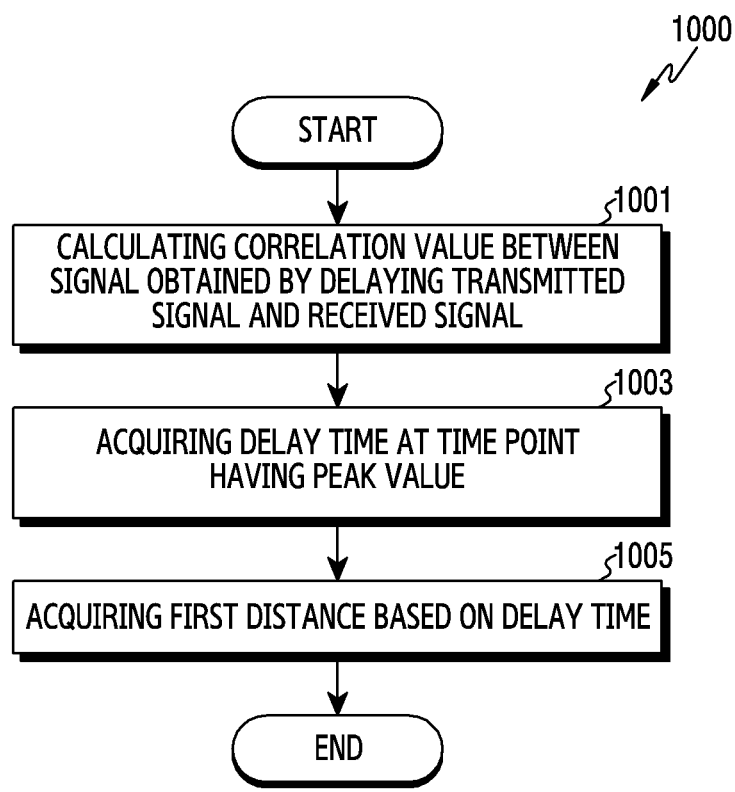
FIG. 10 is a flowchart illustrating operations of acquiring first distance information according to an embodiment of the disclosure.

FIG. 10 is a flowchart 1000 illustrating operations of acquiring first distance information according to an embodiment of the disclosure.

Referring to FIG. 10, it may be understood that the operation subject of the flowchart 1000 illustrated in FIG. 10 is an electronic device (e.g., the electronic device 101 in FIG. 1 or the electronic device 601 in FIG. 6) or a processor (e.g., the processor 120 in FIG. 1 or the processor 610 in FIG. 6) of the electronic device. The operations of FIG. 10 may be an embodiment of the operations of obtaining the first distance information in operation 905 of FIG. 9.

According to various embodiments, in operation 1001, the electronic device 101 or 601 may calculate correlation values between the received signal (e.g., Y in FIG. 4) and a signal (e.g., X(k)) obtained by delaying the transmitted signal by k times the chip duration (e.g., the chip duration 430 in FIG. 4).

According to various embodiments, in operation 1003, the electronic device 101 or 601 may find k, at which the correlation value becomes peak (e.g., k=4 in FIG. 4), determining the delay time at that time as a product of k and the chip duration ($T_c$). According to this embodiment, the delay time may be k*Tc.

According to various embodiments, in operation 1005, the electronic device 101 or 601 may acquire the first distance information based on the acquired delay time. If the delay time obtained in operation 1003 is k*Tc, the first distance information may be $V_1$*k*Tc/2. Here, $V_1$ is the transmission speed of the electromagnetic wave.

According to the flowchart 900 of FIG. 9 described above, the electronic device 101 or 601 may be able to measure a distance more accurately than the scheme of the related art.

According to various embodiments, a method of operating an electronic device (e.g., the electronic device 101 in FIG. 1 or an electronic device 601 in FIG. 6) may include: an operation of transmitting a wireless communication signal by controlling a wireless communication module (e.g., the wireless communication module 192 in FIG. 1 or the wireless communication module 620 in FIG. 6); an operation of receiving a signal returned when the transmitted wireless communication signal is reflected from the external object by controlling the wireless communication module; an operation of acquiring a first distance to the external object based on a transmission time point of the transmitted signal and a reception time point of the received signal; an operation of acquiring a second distance to the external object based on phases of the transmitted signal and the received signal by controlling a phase matching module (e.g., the phase matching module 650 in FIG. 6); and an operation of estimating a distance to the external object based on the first distance and second distance.

According to various embodiments, the operation of acquiring the first distance may include an operation of calculating correlation values between a delayed signal and the received signal by chip duration units from the transmission time point of the transmitted signal; an operation of acquiring a delay time based on the time point having a peak value among the calculated correlation values; and an operation of acquiring the first distance based on the acquired delay time.

According to various embodiments, the operation of acquiring the delay time may include acquiring the delay time by applying an interpolation method when the calculated correlation values equal to or greater than a preset threshold exist at two or more time points.

According to various embodiments, the operation of acquiring the second distance to the external object based on the phases of the transmitted signal and the received signal may include: an operation of separating an I (in-phase) signal and a Q (quadrature-phase) signal from the received signal; and an operation of acquiring phase information of the received signal based on the I signal and the Q signal.

According to various embodiments, the operation of acquiring the second distance may include an operation of acquiring a plurality of second distances to the external object based on a phase of the transmitted signal ($\theta_T$), a phase of the received signal ($\theta_R$), and wavelengths of the transmitted signal and the received signal ($\lambda$) and using equation $$\frac{(\theta_R - \theta_T - \pi + 2n\pi) \times \lambda}{4\pi}$$

(in which n is an integer).

According to various embodiments, the operation of estimating the distance to the external object by comparing the first distance and the second distance includes estimating the second distance closest to the first distance among the acquired plurality of second distances as the distance to the external object.

According to various embodiments, the method may further include an operation of presetting the phase of the transmitted signal ($\theta_T$), and the operation of transmitting the wireless communication signal to the external object may include an operation of transmitting a wireless communication signal having the preset phase, and the operation of acquiring the plurality of second distances may include an operation of acquiring the plurality of second distances using the preset phase of the transmitted signal ($\theta_T$).

According to various embodiments, the operation of transmitting the wireless communication signal to the external object may include an operation of transmitting the wireless communication signal according to a wireless communication scheme of 802.11ad or 802.11ay, the wireless communication signal may include a physical lay protocol data unit (PPDU) of the 802.11ad or the 802.11ay, and the PPDU may include a Golay sequence or a Golay complementary sequence in order to assist in acquisition of channel impulse response.

The electronic device according to various embodiments may be one of various types of electronic devices. The electronic devices may include, for example, a portable communication device (e.g., a smart phone), a computer device, a notebook, a PDA, a portable multimedia device, a portable medical device. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a wireless communication module;
a phase matching module;
at least one processor operatively connected to the phase matching module and the wireless communication module; and
at least one memory operatively connected to the at least one processor,
wherein the at least one memory stores instructions that, when executed, cause the at least one processor to:
control the wireless communication module to transmit a wireless communication signal to an external object,
control the wireless communication module to receive a signal returned based on the transmitted wireless communication signal being reflected from the external object,
acquire a first distance to the external object based on a transmission time point of the transmitted wireless communication signal and a reception time point of the received signal,
separate an I (in-phase) signal and a Q (quadrature-phase) signal from the received signal,
acquire phase information of the received signal based on the I signal and the Q signal,
identify phase information of the transmitted wireless communication signal preset by the electronic device,
acquire a plurality of second distances to the external object based on phase information of the transmitted wireless communication signal and the phase information of the received signal, and
determine a second distance closest to the first distance among the plurality of second distances as a distance to the external object.

2. The electronic device of claim 1, wherein the instructions cause the at least one processor to:
   calculate correlation values between a delayed signal and the received signal by chip duration units from the transmission time point of the transmitted wireless communication signal,
   acquire a delay time based on a time point having a peak value among the correlation values, and
   acquire the first distance based on the delay time.

3. The electronic device of claim 2, wherein the instructions cause the at least one processor to acquire the delay time by applying an interpolation method based on the correlation values equal to or greater than a preset threshold existing at two or more time points.

4. The electronic device of claim 1, wherein the instructions cause the at least one processor to acquire the plurality of second distances to the external object based on a phase of the transmitted wireless communication signal ($\theta_T$), a phase of the received signal ($\theta_R$), and wavelengths of the transmitted wireless communication signal and the received signal ($\lambda$), and using equation $$\frac{(\theta_R - \theta_T - \pi + 2n\pi) \times \lambda}{4\pi}$$

(in which n is an integer).

5. The electronic device of claim 4, wherein the instructions cause the at least one processor to:
   preset the phase of the transmitted wireless communication signal ($\theta_T$),
   control the wireless communication module to transmit a second wireless communication signal having the preset phase, and
   acquire the plurality of second distances using the preset phase of the second wireless communication signal.

6. The electronic device of claim 1,
   wherein the wireless communication module is operated according to one of the Institute of Electrical and Electronics Engineers (IEEE) 802.11ad standard or 802.11ay standard,
   wherein the transmitted wireless communication signal includes a physical layer protocol data unit (PPDU) of the 802.11ad standard or the 802.11ay standard, and
   wherein the PPDU includes a Golay sequence or a Golay complementary sequence in order to assist in acquisition of channel impulse response.

7. A method of operating an electronic device, the method comprising:
   transmitting a wireless communication signal to an external object by controlling a wireless communication module;
   receiving a signal returned based on the transmitted wireless communication signal being reflected from the external object by controlling the wireless communication module;
   acquiring a first distance to the external object based on a transmission time point of the transmitted wireless communication signal and a reception time point of the received signal;
   separating an I (in-phase) signal and a Q (quadrature-phase) signal from the received signal;
   acquiring phase information of the received signal based on the I signal and the Q signal;
   identifying phase information of the transmitted wireless communication signal preset by the electronic device;
   acquiring a plurality of second distances to the external object based on phase information of the transmitted wireless communication signal and the phase information of the received signal; and
   determining a second distance closest to the first distance among the plurality of second distances as a distance to the external object.

8. The method of claim 7, wherein the acquiring of the first distance includes:
   calculating correlation values between a delayed signal and the received signal by chip duration units from the transmission time point of the transmitted wireless communication signal;
   acquiring a delay time based on a time point having a peak value among the calculated correlation values; and
   acquiring the first distance based on the delay time.

9. The method of claim 8, wherein the acquiring of the delay time includes acquiring the delay time by applying an interpolation method based on the calculated correlation values equal to or greater than a preset threshold existing at two or more time points.

10. The method of claim 7, wherein the acquiring of the second distance includes acquiring the plurality of second distances to the external object based on a phase of the transmitted wireless communication signal ($\theta_T$), a phase of the received signal ($\theta_R$), and wavelengths of the transmitted signal and the received signal ($\lambda$), and using equation $$\frac{(\theta_R - \theta_T - \pi + 2n\pi) \times \lambda}{4\pi}$$

(in which n is an integer).

11. The method of claim 10, further comprising:
   presetting the phase of the transmitted wireless communication signal ($\theta_T$),
   wherein the transmitting of the wireless communication signal to the external object includes transmitting a second wireless communication signal having the preset phase, and
   wherein the acquiring of the plurality of second distances includes acquiring the plurality of second distances using the preset phase of the second wireless communication signal.

12. The method of claim 7,
   wherein the transmitting of the wireless communication signal to the external object includes transmitting the wireless communication signal according to an Institute of Electrical and Electronics Engineers (IEEE) 802.11ad standard or 802.11ay standard,
   wherein the wireless communication signal includes a physical layer protocol data unit (PPDU) of the 802.11ad or the 802.11ay, and
   wherein the PPDU includes a Golay sequence or a Golay complementary sequence in order to assist in acquisition of channel impulse response.

13. An electronic device comprising:
   a wireless communication module configured to transmit a wireless communication signal and receive a signal returned based on the transmitted wireless communication signal being reflected from an external object;
   a phase matching module configured to separate an I (in-phase) signal and a Q (quadrature-phase) signal from the received signal, acquire phase information of the received signal, identify phase information of the transmitted wireless communication signal preset by the electronic device, and estimate a plurality of second distances to the external object based on phase information of the transmitted wireless communication signal and the acquired phase information of the received signal;
- at least one processor operatively connected to the phase matching module and the wireless communication module; and
- at least one memory operatively connected to the at least one processor,
- wherein the at least one memory stores instructions that, when executed, cause the at least one processor to:
  - acquire a first distance to the external object based on a transmission time point of the transmitted wireless communication signal and a reception time point of the received signal, and
  - determine a second distance closest to the first distance among the plurality of second distances as a distance to the external object.

14. The electronic device of claim 13, wherein the phase matching module is configured to acquire the plurality of second distances to the external object based on a phase of the transmitted wireless communication signal ($\theta_T$), a phase of the received signal ($\theta_R$), and wavelengths of the transmitted wireless communication signal and the received signal ($\lambda$), and using equation $$\frac{(\theta_R - \theta_T - \pi + 2n\pi) \times \lambda}{4\pi}$$

(in which n is an integer).

15. The electronic device of claim 14,
- wherein the instructions cause the at least one processor to:
  - preset the phase of the transmitted wireless communication signal ($\theta_T$), and
  - control the wireless communication module to transmit a wireless communication signal having the preset phase, and
- wherein the phase matching module acquires the plurality of second distances using the preset phase of the transmitted wireless communication signal ($\theta_T$).

* * * * *